May 18, 1926.
E. H. ARCHER
1,585,071
CLINKER EXTRACTING SHOVEL AND METHOD OF MAKING SAME
Filed Sept. 3, 1925
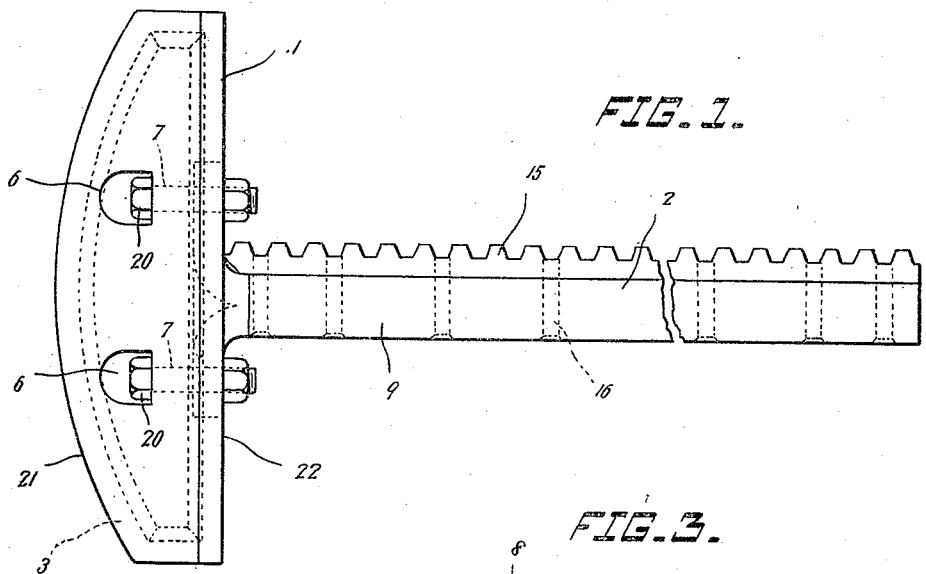
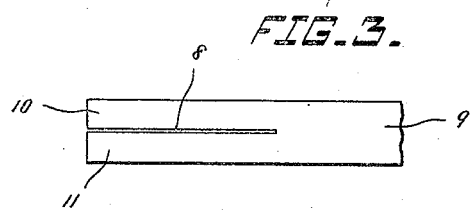
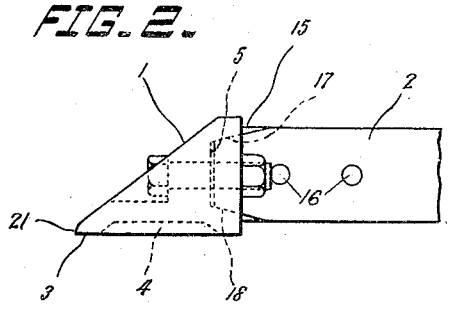
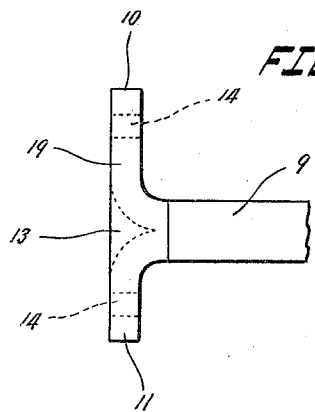
Inventor
Elbert H. Archer
By Frank H. Schwartz
Attorney Patented May 18, 1926.

1,585,071

UNITED STATES PATENT OFFICE.

ELBERT H. ARCHER, OF COVINGTON, VIRGINIA, ASSIGNOR TO COVINGTON MACHINE COMPANY, INC., OF COVINGTON, VIRGINIA, A CORPORATION OF VIRGINIA.

CLINKER-EXTRACTING SHOVEL AND METHOD OF MAKING SAME.

Application filed September 3, 1925. Serial No. 54,214.

This invention relates to shovels for use on machines for extracting clinker or other material from furnaces, ovens, retorts, etc., and comprises all improvements over the prior art which are disclosed in this application. The shovel is particularly adapted for use in extracting clinker from zinc oxide furnaces of the rectangular, square, round or tunnel type. The shovel may also be used to extract clinker or other material from lead oxide or other furnaces, ovens, retorts, etc.

When coal is burned with zinc ore in a zinc oxide furnace, a tough, comparatively thin clinker is left on the grate bars. To remove this clinker from the furnace, an extractor broadly similar to that shown in Patent 786,067 to McConnell is used. But the shovel head must be so constructed that in continued use it will effectively dig under the clinker instead of riding over the top of it. This requires a special construction of the bottom of the shovel head. It also requires a strong and rigid connection between the shovel head and ram bar that can be effectively maintained. Also, as the furnace opening is usually comparatively small, the connection of the ram bar to the shovel head while it must be rigid, must also be such as to provide a maximum extracting area at the rear of the shovel.

The above and other objects which will hereinafter appear, are attained by new and useful improvements as disclosed in this application. To enable others skilled in the art to fully understand the essential features of the improvements, drawings have been annexed as a part of this disclosure.

Fig. 1 is a plan view of the shovel.

Fig. 2 is a side elevation of the shovel.

Fig. 3 is a plan view showing the end of the ram bar slitted preparatory to the flanging operation.

Fig. 4 is a plan view showing the legs formed by the slit, bent outwardly to form the connecting flange, and with the recess between the legs filled with welding material.

The shovel comprises a shovel head 1 and a ram bar 2. The shovel head is preferably cast with a chilled bottom surface 3, bottom depression or recess 4, flared ram bar recess 5, bolt head recesses 6, and bolt openings 7.

The ram bar is preferably made by forming a slit 8 by a cutting torch or saw in the end of a steel ram bar 9 to form two legs 10, 11. The slitted end of the bar is then heated and the legs 10, 11 are bent outwardly to the position shown in Fig. 4. The recess 12 left between the legs by the flanging operation is filled with welding material 13 welded in position to make a strong solid end. Thus the full strength of the ram bar is maintained. Leg 11 is then cut off to the proper length and the flanged end of the bar is machined tapering to fit the flared recess 5 in the shovel head. Bolt holes 14 are drilled and rack 15 is pinned and riveted to the bar by rivets 16 as shown in Fig. 1.

By making the bottom surface chilled, a harder and more durable wearing surface is provided. The bottom surface 3 preferably extends all the way around the shovel and is preferably of substantially uniform width. This, together with depression 4 causes the bottom surface to wear uniformly and flat. If this depression 4 were not present, the front and back bottom edges would wear rounded, and cause the shovel to climb on top of the clinker, or other material, instead of getting between the clinker and the grate bars or oven bottom, and thus the clinker would not be broken loose from the bottom so it could be extracted.

Also the connection of the ram bar to the shovel head must be strong and rigid and capable of being readily maintained rigid, in order that the shovel head may be forced under the tough clinker. This rigid construction is obtained by the cored recess 5 having flared walls 17, 18, against which the correspondingly tapered flanged end 19 is secured by bolts 20. It will be seen that there is a slight space between the bottom of recess 15 and end of the ram bar in order to allow the tapered and flared surfaces to be always brought up to a tight fit.

It will be observed that flange 19 is of considerable length and rigidity and therefore as this flange extends laterally of the shovel, the shovel head is held rigid against the action of any unbalanced force exerted on either side front edge of the shovel head. At the same time the flanged end 19 sets within the rear face of the shovel head and thus enables the rear face of the shovel head to have a maximum capacity to extract the clinker. When the shovel is pushed forward, edge 21 breaks up the clinker, which slides up over the shovel head and falls to the rear thereof. When the shovel is pulled back, the rear face 22 pushes the loosened clinker from the furnace. Also as flanged end 19 sets within the rear face of the shovel head, it is protected from the abrasive action of the clinker or other material.

All changes which properly come within the spirit and range of equivalency of the following claims are intended to be embraced within the scope of the claims.

I claim:

1. A clinker extracting shovel comprising, a head provided with a flared recess, a ram bar having a tapered portion fitting the flared part of said recess, and means firmly securing said tapered portion in said recess.

2. The shovel set forth in claim 1 in which the flared recess is in the rear of the head.

3. The shovel set forth in claim 1 in which the length of said flared recess is considerably greater than its width and the length of the recess extends laterally of the head, and the sidewalls of the recess provide the flare.

4. A clinker extracting shovel comprising, a head provided with a recess whose length extends laterally of the head and is considerably greater than its width, a ram bar having a flange extending transversely of the bar and the length of said flange being considerably greater than the width of the ram bar, and means securing said flange in said recess.

5. The shovel set forth in claim 4 in which the recess is in the rear face of the head.

6. The shovel set forth in claim 4 in which the side walls of the recess are flared outwardly relatively to each other, and the flange has tapered faces fitting said flared walls.

7. The shovel set forth in claim 4 in which the recess is in the rear face of the head and the side walls of the recess are flared outwardly relatively to each other, and the flange has tapered faces fitting said flared walls.

8. A clinker extracting shovel comprising, a ram bar having a transversely extending shovel attaching flange comprising oppositely outward bent integral portions of the ram bar.

9. The shovel set forth in claim 8 in which said flange portions are connected by welding material.

10. The method of making a clinker extracting shovel comprising, slitting the shovel attaching end of a ram bar to form a pair of legs, and bending said legs outwardly in opposite directions to provide a flange of considerable length extending transversely of the ram bar.

11. The method set forth in claim 10 in which the resultant recess between the legs is filled up with welding material.

12. A clinker extracting shovel comprising, a cast head having a chilled bottom bearing surface and a considerable recessed area adjacent said bearing surface.

ELBERT H. ARCHER.